US010844588B1

(12) United States Patent
Riley et al.

(10) Patent No.: US 10,844,588 B1
(45) Date of Patent: Nov. 24, 2020

(54) STORMWATER DRAIN INSERTS

(71) Applicant: New Pig Corporation, Tipton, PA (US)

(72) Inventors: Matthew James Riley, Hollidaysburg, PA (US); Matthew A. Romito, State College, PA (US)

(73) Assignee: New Pig Corporation, Tipton, PA (US)

( * ) Notice: Subject to any disclaimer, the term of this patent is extended or adjusted under 35 U.S.C. 154(b) by 0 days.

(21) Appl. No.: 16/531,891

(22) Filed: Aug. 5, 2019

(51) Int. Cl.
*E03F 5/04* (2006.01)
*E03F 5/14* (2006.01)
*B01D 29/23* (2006.01)

(52) U.S. Cl.
CPC ............ *E03F 5/0404* (2013.01); *B01D 29/23* (2013.01); *E03F 5/14* (2013.01); *B01D 2201/0423* (2013.01); *B01D 2201/48* (2013.01)

(58) Field of Classification Search
CPC .......... E03F 5/0404; E03F 5/14; B01D 29/23; B01D 35/02; B01D 2201/0415; B01D 2201/0423; B01D 2201/48
USPC ..... 210/163, 164, 170.03, 747.3; 404/2, 4, 5
See application file for complete search history.

(56) References Cited

U.S. PATENT DOCUMENTS

| | | | |
|---|---|---|---|
| 6,086,758 A | 7/2000 | Schilling et al. | |
| 6,093,314 A | 7/2000 | Wilson et al. | |
| 6,106,707 A | 8/2000 | Morris et al. | |
| 6,231,758 B1 | 5/2001 | Morris et al. | |
| 6,294,095 B1 | 9/2001 | Lewis | |
| 6,517,709 B1 | 2/2003 | Cardwell et al. | |
| 6,531,059 B1 | 3/2003 | Morris et al. | |
| 6,537,446 B1 | 3/2003 | Sanguinetti | |
| 6,551,023 B2* | 4/2003 | Allard | E03F 5/0404 210/163 |
| 6,632,501 B2 | 10/2003 | Brownstein et al. | |
| 6,666,974 B2 | 12/2003 | Page | |
| 6,793,811 B1* | 9/2004 | Fleischmann | E03F 5/0404 210/163 |
| 6,805,804 B2 | 10/2004 | Page | |
| 7,112,274 B1 | 9/2006 | Sanguinetti | |
| 7,132,045 B1* | 11/2006 | Trangsrud | E03F 5/0404 210/163 |
| 7,186,333 B2 | 3/2007 | Kluge | |
| 7,201,843 B2 | 4/2007 | Sasaki et al. | |
| 7,524,414 B1 | 4/2009 | Barragan | |

(Continued)

OTHER PUBLICATIONS

The International Search Report and the Written Opinion of the International Searching Authority for International Application No. PCT/US2020/030513, 15 pages, dated Apr. 8, 2020.

*Primary Examiner* — Christopher Upton
(74) *Attorney, Agent, or Firm* — Alan G. Towner; Leech Tishman Fuscaldo & Lampl

(57) ABSTRACT

Stormwater drain insert assemblies that reduce or remove environmental runoff during rain storms and the like are disclosed. The stormwater drain insert assemblies include a strainer basket and filter bag that capture sediment, hydrocarbons, heavy metals and other contaminants, but allow water to pass through. The stormwater drain insert assemblies include a top bib of flexible sheet material such as water-impermeable fabric surrounding and supporting the strainer basket. The strainer basket includes at least one raised overflow port extending upwardly from a top panel of the basket. The top bib has a frame that may be adjustable in size in order to fit into various sizes of catch basins, resting on the lip between the top grate and the catch basin.

20 Claims, 12 Drawing Sheets

(56) References Cited

U.S. PATENT DOCUMENTS

| | | | |
|---|---|---|---|
| 7,771,591 B2 | 8/2010 | Lucas | |
| 7,837,869 B2 | 11/2010 | Peters, Jr. et al. | |
| 7,875,178 B2 | 1/2011 | Ashliman | |
| 7,959,799 B2 | 6/2011 | Happel et al. | |
| 8,012,346 B2 | 9/2011 | Peters, Jr. et al. | |
| 8,221,632 B2 * | 7/2012 | McInnis | E03F 5/0404 210/164 |
| 8,323,485 B2 * | 12/2012 | Blundell | E03F 5/0404 210/163 |
| 8,591,729 B2 | 11/2013 | Alqanee | |
| 8,608,956 B2 | 12/2013 | Moulton et al. | |
| 8,715,491 B2 | 5/2014 | Shaw et al. | |
| 9,194,116 B2 | 11/2015 | Bailey et al. | |
| 9,322,156 B2 | 4/2016 | McInnis et al. | |
| 9,624,658 B2 | 4/2017 | Hannah et al. | |
| 9,963,865 B2 | 5/2018 | Groff et al. | |
| 10,508,430 B2 * | 12/2019 | Riley | E03F 5/14 |
| 2004/0016692 A1 | 1/2004 | Sasaki et al. | |
| 2005/0183997 A1 * | 8/2005 | Happel | E03F 5/0404 210/163 |
| 2008/0290042 A1 | 11/2008 | Hanson et al. | |
| 2012/0145612 A1 * | 6/2012 | McInnis | E03F 5/0404 210/163 |
| 2013/0020242 A1 | 1/2013 | Vreeland | |
| 2013/0186811 A1 | 7/2013 | Kaiser | |
| 2013/0292317 A1 | 11/2013 | Shaw et al. | |
| 2013/0299402 A1 * | 11/2013 | Rogahn | E03F 5/0404 210/163 |
| 2014/0238915 A1 * | 8/2014 | McInnis | E03F 5/0404 210/170.03 |
| 2019/0292766 A1 | 9/2019 | Riley et al. | |

\* cited by examiner

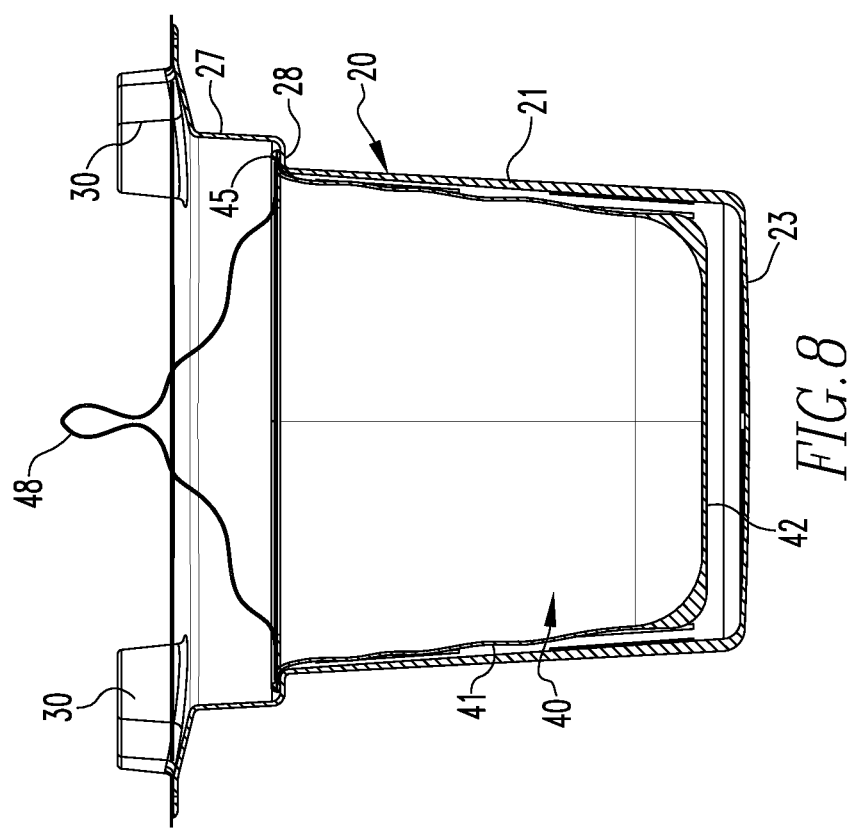
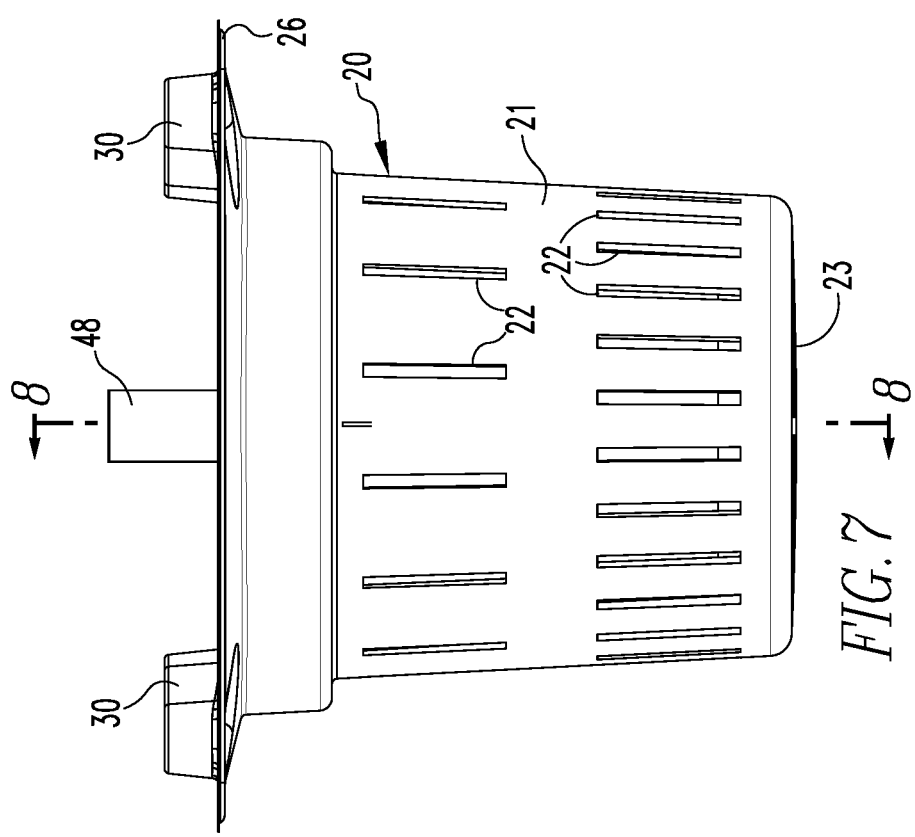

STORMWATER DRAIN INSERTS

FIELD OF THE INVENTION

The present invention relates to stormwater drain inserts that filter pollutants from stormwater runoff and are designed to handle overflow conditions.

BACKGROUND INFORMATION

Certain types of conventional stormwater drain inserts include a layer of water permeable fabric that captures sediment and other contaminants, but allows water to pass through the fabric. The stormwater drain inserts may be held in place within a catch basin by the weight of a storm drain grate that presses around the periphery of the fabric layer. A central sediment bag may extend downwardly from a flat layer of the water permeable fabric, for example, as disclosed in U.S. patent application Ser. No. 15/935,175, filed Mar. 26, 2018, which is incorporated herein by reference.

SUMMARY OF THE INVENTION

The present invention provides stormwater drain insert assemblies that reduce or remove environmental runoff during rain storms and the like. The stormwater drain insert assemblies include a strainer basket and filter bag that capture sediment, hydrocarbons, heavy metals and other contaminants, but allow water to pass through. The stormwater drain insert assemblies include a top bib of a flexible sheet material such as water-impermeable fabric surrounding and supporting the strainer basket. The strainer basket includes at least one raised overflow port extending upwardly from a top panel of the basket. The top bib has a frame that may be adjustable in size in order to fit into various sizes of catch basins, resting on the lip between the top grate and the catch basin.

An aspect of the present invention is to provide a stormwater drain insert assembly comprising a top bib including a flexible sheet of material with a peripheral frame and a central bib opening; a strainer basket supported by the top bib below the central bib opening comprising a sidewall having side openings, a top panel having a central mouth opening, a support shoulder adjacent to the central mouth opening above the sidewall, and at least one raised overflow port extending upward from an upper surface of the top panel structured and arranged to allow wastewater to flow therethrough if a height of the wastewater exceeds a height of the raised overflow port; and a filter bag removably installed in the strainer basket, the filter bag comprising a water permeable sidewall extending downward from an upper rim, wherein the upper rim is supported by the support shoulder of the strainer basket inside the central mouth opening of the strainer basket. Filter bags for installation in the strainer of such a stormwater drain insert are also provided.

Another aspect of the present invention is to provide a stormwater drain insert comprising a top bib including a flexible sheet of material with a peripheral frame and a central bib opening; and a strainer basket structured and arranged to receive a filter bag, the strainer basket supported by the top bib below the central bib opening comprising a sidewall having side openings, a top panel having a central mouth opening a support shoulder adjacent to the central mouth opening above the sidewall, and at least one raised overflow port extending upward from an upper surface of the top panel structured and arranged to allow wastewater to flow therethrough if a height of the wastewater exceeds a height of the raised overflow port.

These and other aspects of the present invention will be more apparent from the following description.

BRIEF DESCRIPTION OF THE DRAWINGS

FIG. 7 is a side view of a strainer basket with a filter bag installed therein in accordance with an embodiment of the present invention.

FIG. 8 is a side sectional view taken through section 8-8 of FIG. 7.

DETAILED DESCRIPTION

Figure 1:
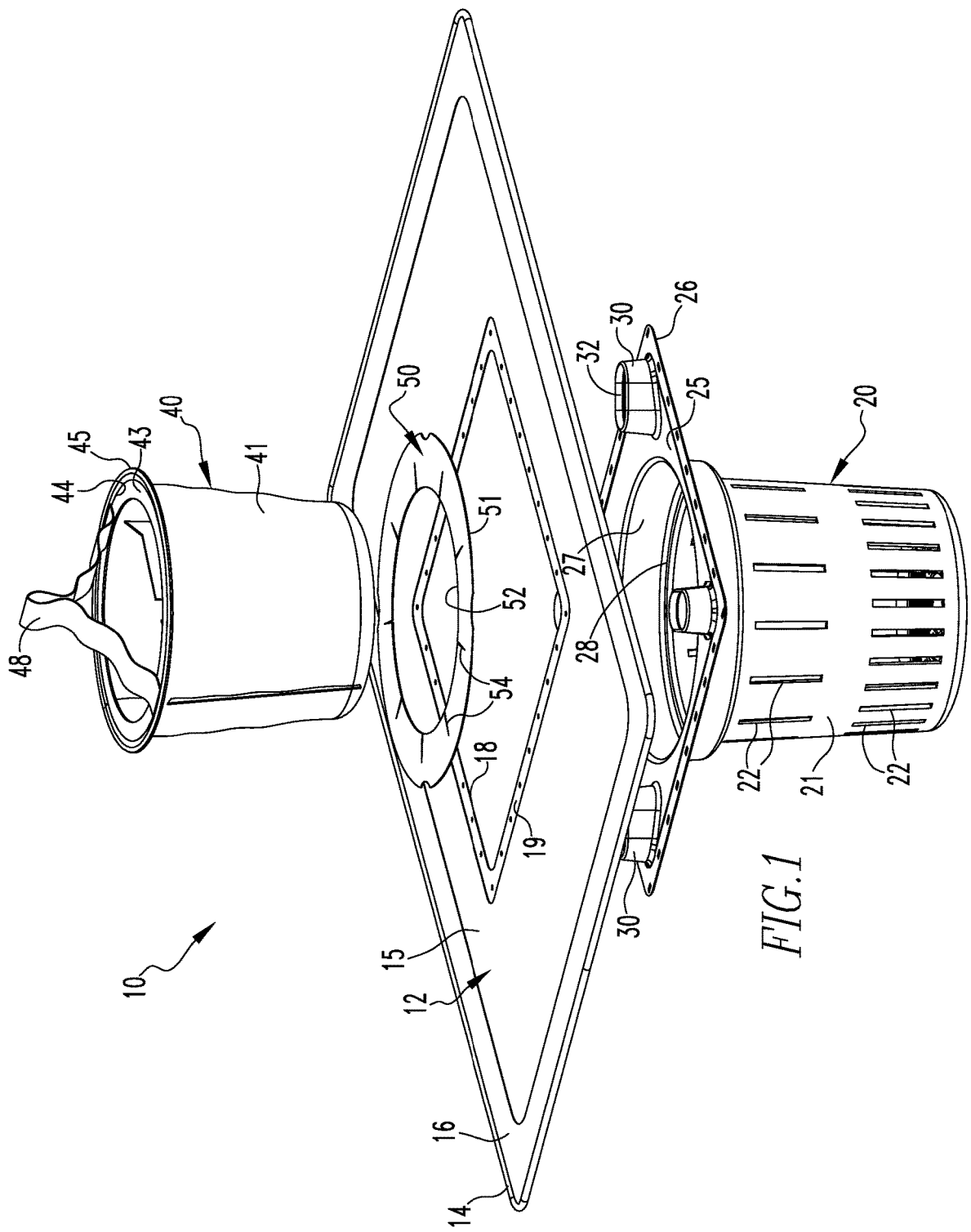
FIG. 1 is an exploded isometric view of a stormwater drain insert assembly in accordance with an embodiment of the present invention.

FIG. 1 illustrates a stormwater drain insert assembly 10 in accordance with an embodiment of the present invention. The stormwater drain insert assembly 10 includes a top bib 12 having an outer adjustable frame 14. A flexible sheet of material 15 such as a liquid impermeable fabric extends inwardly from the frame 14. The flexible sheet 15 may comprise, for example, polyurethane-coated ballistic nylon fabric, e.g., comprising 1050 denier nylon yarn with a basis weight of 15 ounces per square yard. A pocket 16 in the sheet 15 encloses the adjustable frame 14. The pocket 16 may have a flat width of from 0.5 to 6 inches, for example, 3.5 inches. As further shown in FIG. 1, the stormwater drain insert assembly 10 includes a strainer basket 20, a filter bag 40, and an optional baffle ring 50.

The adjustable frame 14 of the top bib 12 may include two inner telescoping frame rods 14 receiving two outer telescoping frame tubes. The telescoping action of the inner frame rods and outer frame tubes allows the adjustable peripheral frame 14 to extend lengthwise and widthwise in order to fit within various sizes of catch basins. From a fully collapsed condition to a fully extended condition, each side of the peripheral frame 14 can almost double in size, and the area within the adjustable peripheral frame 14 may almost quadruple in size. Frictional engagement between the inner telescoping frame rods and the outer telescoping frame tubes may be provided in order to reduce or prevent unwanted movement of the inner arms within the outer tubes during usage. The telescoping action when adjusting the frame 14 to the catch basin size does not cause snagging of the fabric 15 of the top bib 12, thus eliminating the need for edge slits in the fabric.

The frame 14 may be made of any suitable material, such as stainless steel or another metal, such as brass or aluminum. The outer surfaces of the inner rods and/or the inner surfaces of the outer tubes may be provided with a rough or irregular surface in order to increase drag between the rods and tubes. This mitigates the issue of smooth rods that could self-retract due to the weight of collected sediment, causing the assembly to fall into the storm basin when the grate is removed for servicing. Typical diameters of the inner rods may be 0.25±0.06 inches, or a ¼×20 threaded rod. Typical diameters of the outer tubes may be an inner diameter of 0.25±0.06 inches, and an outer diameter of 0.394±0.06 inches.

Figure 2:
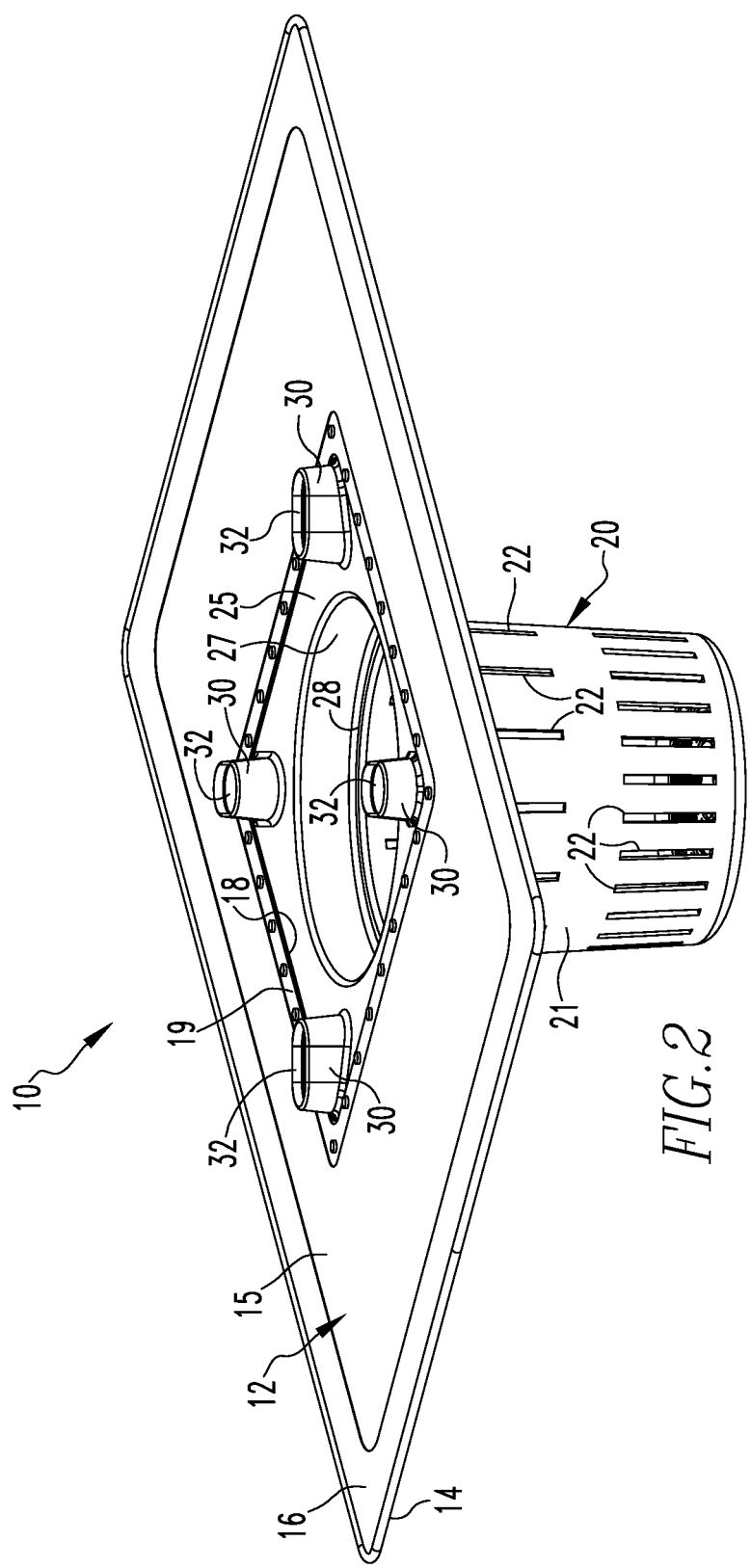
FIG. 2 is a top isometric view and FIG. 3 is a bottom isometric view of a strainer basket supported by a top bib for use in a stormwater drain insert assembly in accordance with an embodiment of the present invention.

As shown in FIGS. 1 and 2, the flexible bib sheet 15 has a central opening 18. In the embodiment shown, a stiffening frame 19 is provided adjacent to the central opening 18 to provide structural integrity to the fabric or other material of the bib sheet 15. The frame 19 may be made from a single or multiple pieces of relatively rigid material such as plastic or metal strips. The strips may be from 0.5 to 2 inches wide, and from 0.02 to 0.04 inch thick. For example, the strips of the stiffening frame 19 may by 1 inch wide and 0.03 inch thick. In certain embodiments, the stiffening frame 19 may be located under the upper surface of the bib sheet 15, e.g., in a pocket or fold of the bib material.

Figure 3:
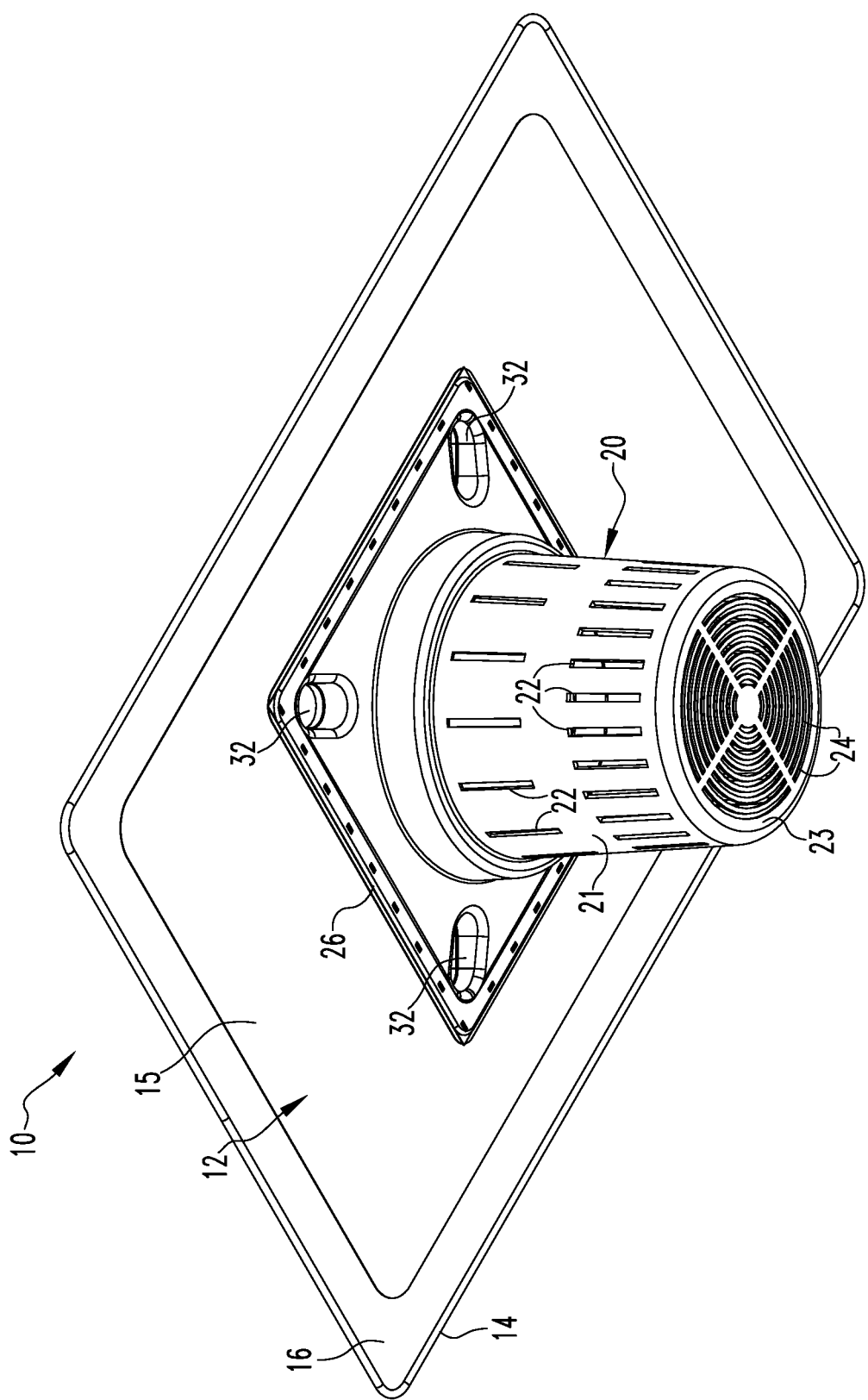
Figure 4:
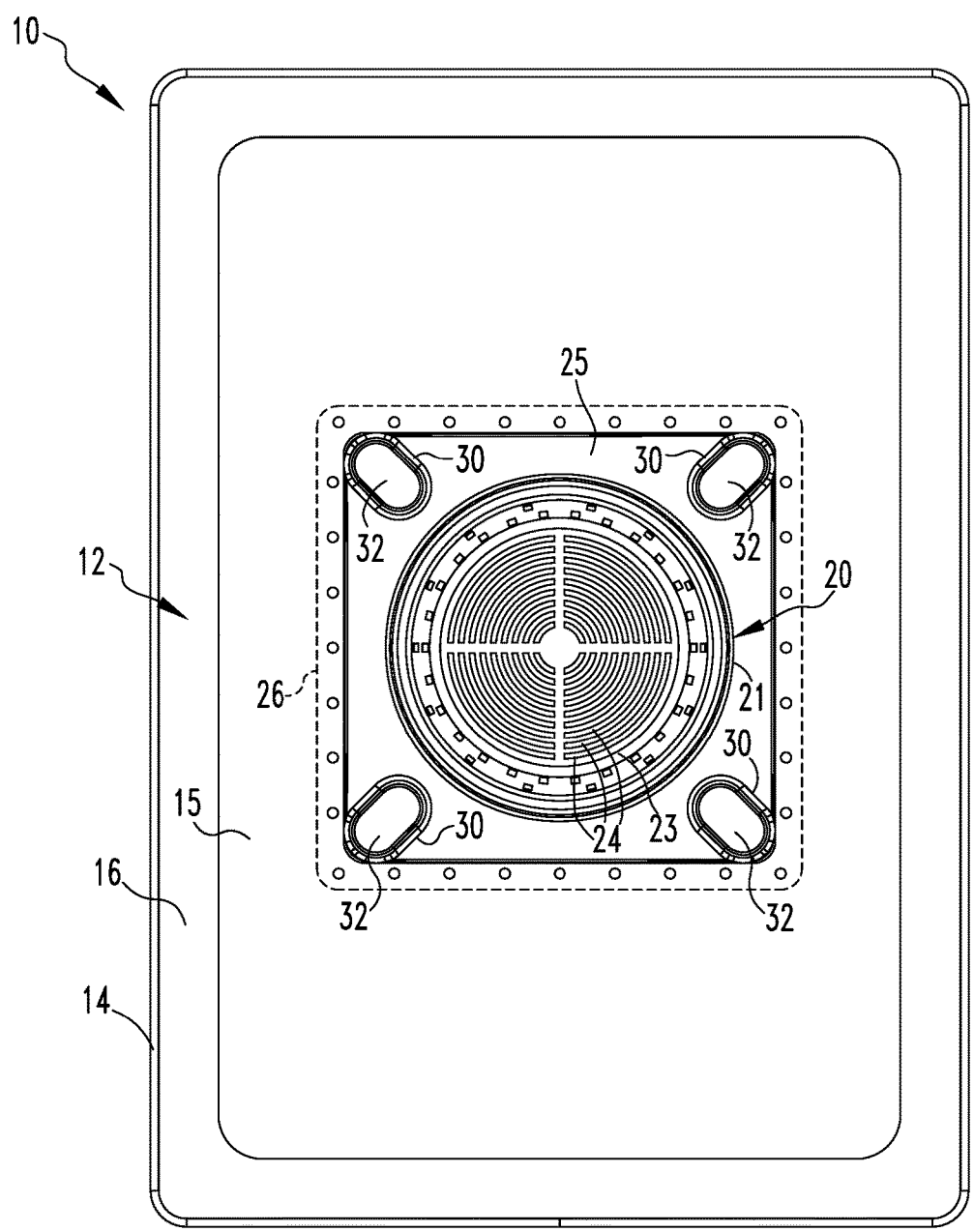
FIGS. 4 and 5 are top and side views, respectively, of the strainer basket and top bib of FIGS. 2 and 3.
Figure 5:
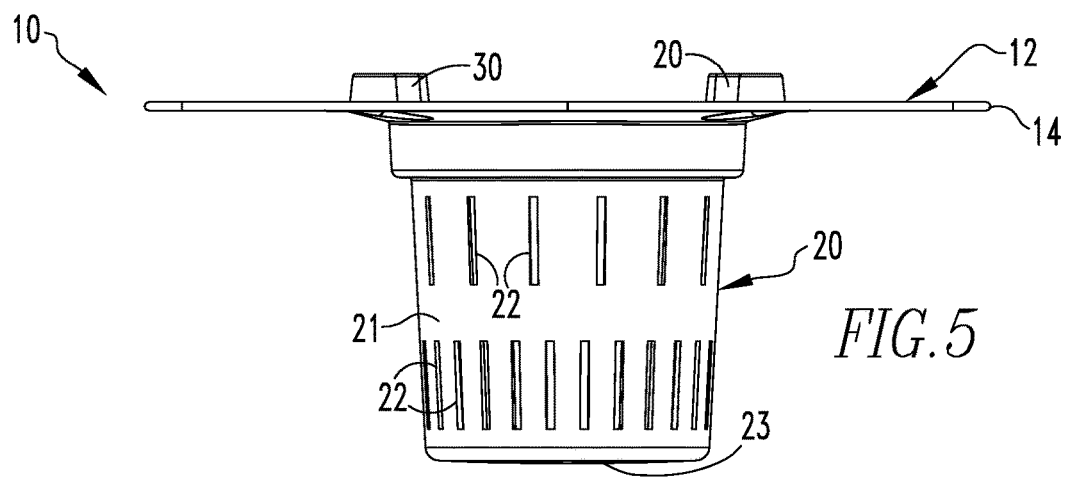

As shown in FIGS. 1 and 3, the strainer basket 20 includes an outer peripheral edge 26 that may be aligned with the stiffening frame 19 of the top bib 12. As shown in FIGS. 1-5 and 9-11, the strainer basket 20 includes a sidewall 21 having side openings 22 and a bottom wall 23 having bottom openings 24. The side openings 22 may typically range from 10 to 90 percent of the sidewall 21 surface, for example, from 30 to 70 percent, and each opening 22 may have an area of from 0.015 to 9 square inches, for example, from 0.5 to 1.5 square inches. The optional bottom openings 24 may typically range from zero to 90 percent of the bottom wall 23 surface, for example, from 10 to 80 percent, or from 30 to 70 percent. Each bottom opening may have an area of from 0.015 to 6.25 square inches, for example, from 0.5 to 1.5 square inches. A top panel 25 is provided above the sidewall 21 and includes an outer peripheral edge 26, which may be aligned with the stiffening frame 19 of the top bib 12. A central mouth opening 27 is provided in the top panel 25 of the strainer basket 20, and a support shoulder 28 is provided below the generally cylindrical mouth opening 27.

The internal volume of the strainer basket 20 may typically range from 0.5 to 3.5 cubic feet, or from 1 to 2 cubic feet, for example, 1.3 cubic feet. The height of the strainer basket 20 may typically be from 6 to 36 inches, or from 12 to 24 inches, for example, 15 inches. The central mouth opening 27 of the strainer basket 20 may typically have a diameter of from 8 to 24 inches, or from 12 to 20 inches, for example, 16 inches.

As further shown in FIGS. 1-5 and 9-11, the strainer basket 20 includes raised overflow ports 30 extending upwardly from the top panel 25. Each raised overflow port 30 includes an overflow opening 32. The height of each overflow port 30 measured from the upper surface of the top panel 25 to the upper rim of the overflow port may typically be from 0.5 to 5 inches, or from 1 to 2 inches, for example, 1.5 inches. The total cross-sectional area of the openings 32 of the overflow ports 30 may typically be from 5 to 20 percent of the cross-sectional area of the central mouth opening 27 of the strainer basket 20, or from 8 to 15 percent, for example, 12 or 13 percent.

As shown in FIGS. 1, 6-8, 12 and 13, the filter bag 40 includes a side wall 41 and a bottom wall 42. An upper rim 43 is provided at the top of the filter bag 40, and an upper central opening 44 is defined at the top of the filter bag 40. A retention ring 45 is provided at or near the outer periphery of the upper rim 43, such as within a pocket or fold of the fabric of the filter bag 40. As described more fully below, the retention ring 45 rests on the support shoulder 28 of the strainer basket 20 when the filter bag 40 is installed within the strainer basket 20. In addition to supporting the filter bag 40, the retention ring 45 may provide outward radial force against the central mouth opening 27 of the strainer basket 20 in order to reduce or eliminate unwanted by-pass leakage around the exterior of the upper rim 43 of the filter bag 40. The filter bag 40 may include interior absorbent fingers 47 and a lifting handle or strap 48.

The retention ring 45 may have an outer diameter sized to match or be slightly larger (⅛ to ¼ inch) than the inner diameter of the mouth opening 27 of the strainer basket 20 adjacent to the support shoulder 28. The gap in the retention ring 45 allows for compression of the ring to fit onto the mouth opening 27. The retention ring 45 may be made of rigid plastic or metal, for example, stainless steel and may have a circular cross-section. The cross-sectional diameter of the steel may be ⅛ to ⅝ inch, for example, ⅜ inch. The steel may be formed into a circle for incorporation into the filtration bag with approximately 0.5 inch open space between the ends.

Figure 13:
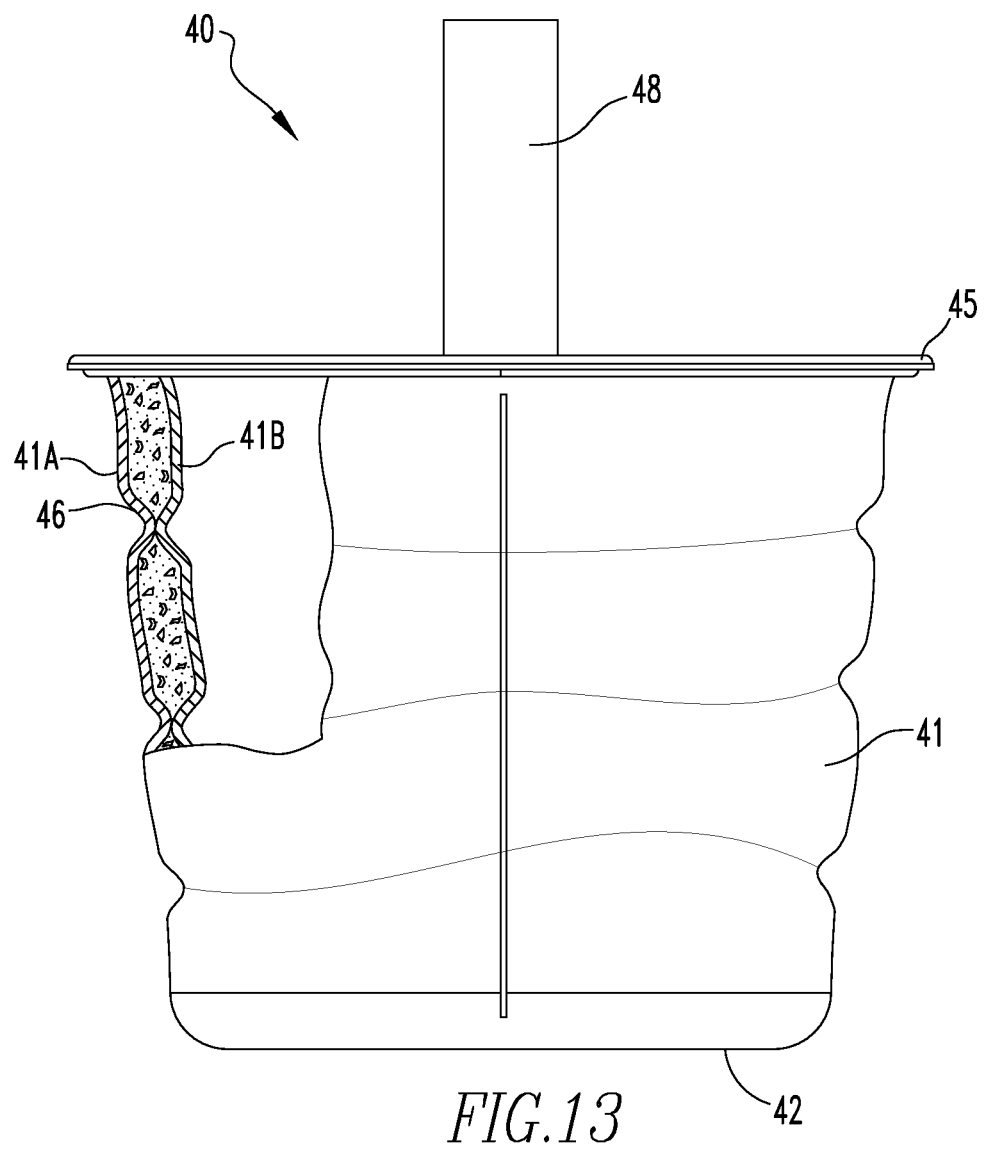
FIG. 13 is a side view of the filter bag shown in FIG. 12 with a portion thereof shown in section.

As shown in FIG. 13, the filter bag 40 may include multiple layers including an outer water permeable fabric layer 41A, an inner water permeable fabric layer 41B, and an absorbent media 46 filling a pocket or pockets therebetween. The absorbent media 46 filling the pocket(s) of the porous fabric can be organic and/or heavy metal absorbing media such as zeolite, activated carbon, perlite, vermiculite, compost, iron treated compost and blends of the above. For example, the absorbent media 46 may be a blend of zeolite and activated carbon at 50/50 volume blend.

Figure 6:
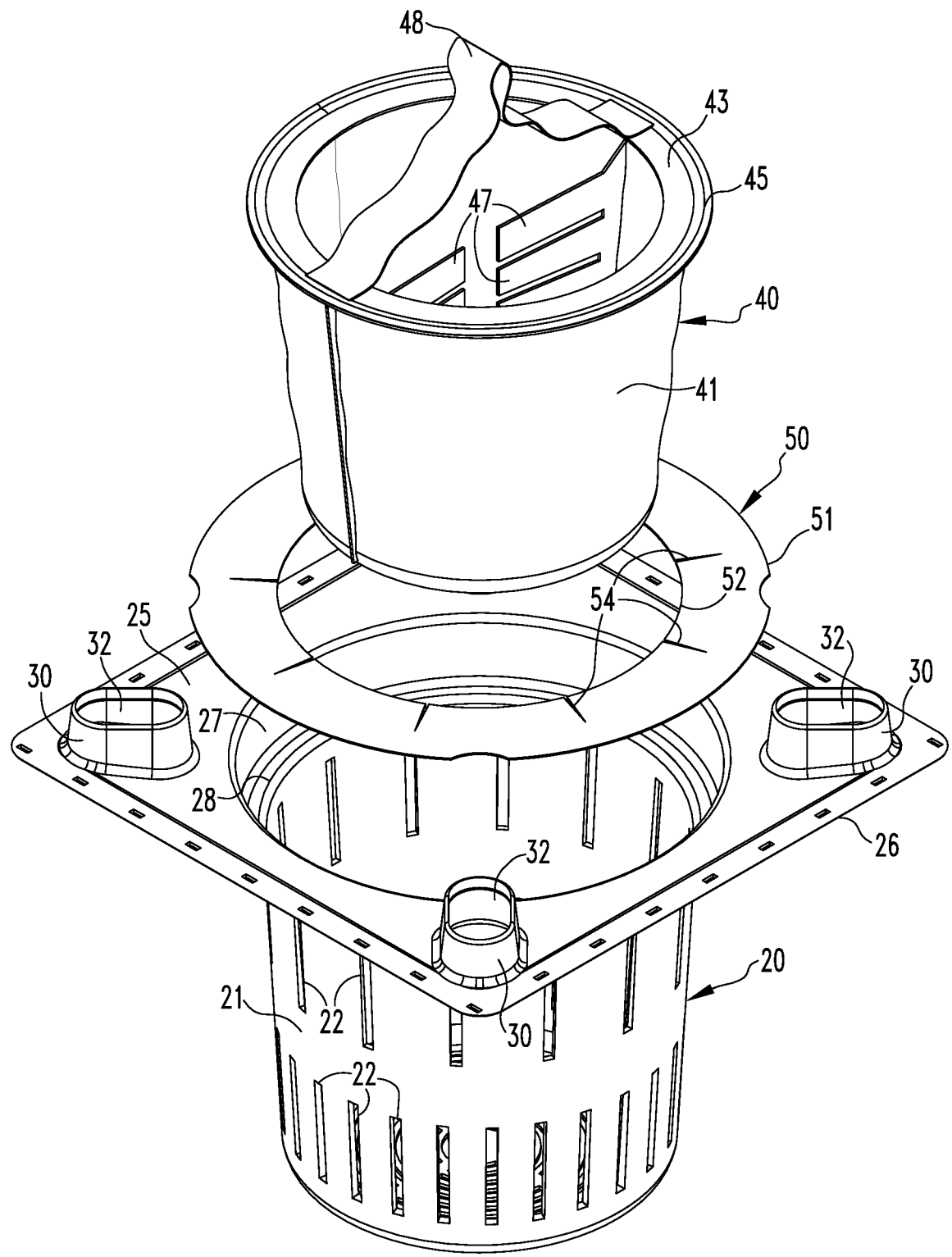
FIG. 6 is an exploded isometric view of a strainer basket, filter bag and optional baffle ring for use in a stormwater drain insert assembly in accordance with an embodiment of the present invention.
Figure 9:
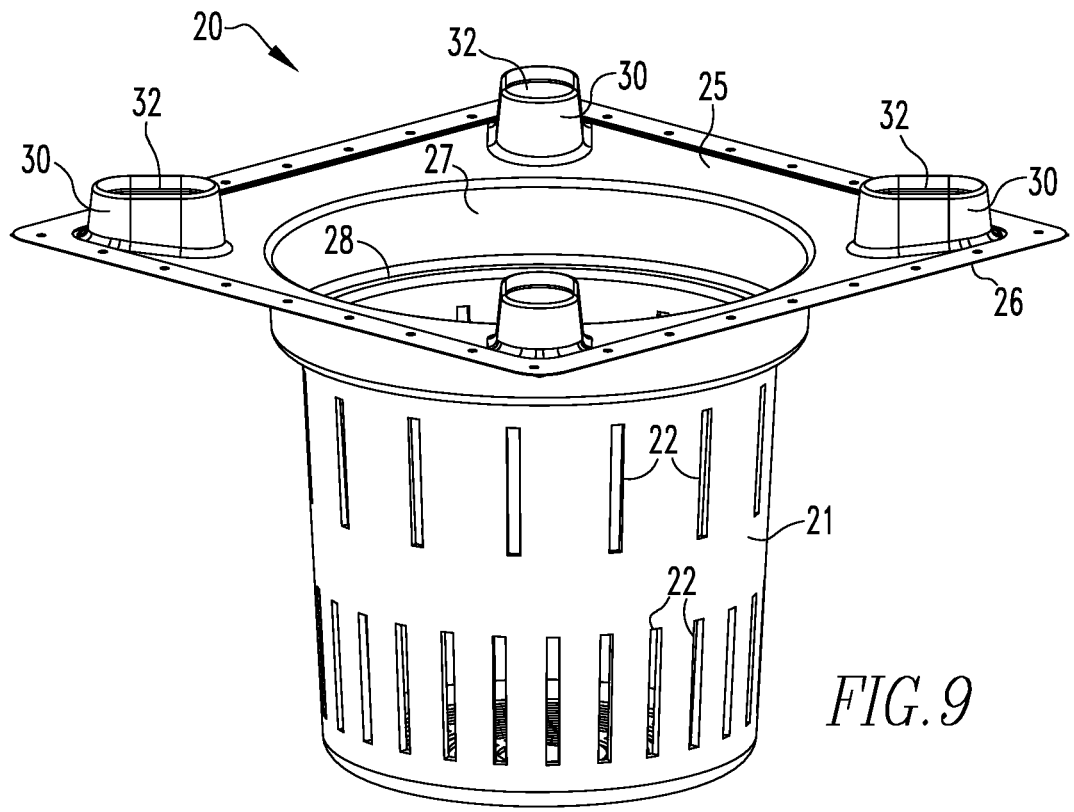
FIG. 9 is a top isometric view.
Figure 10:
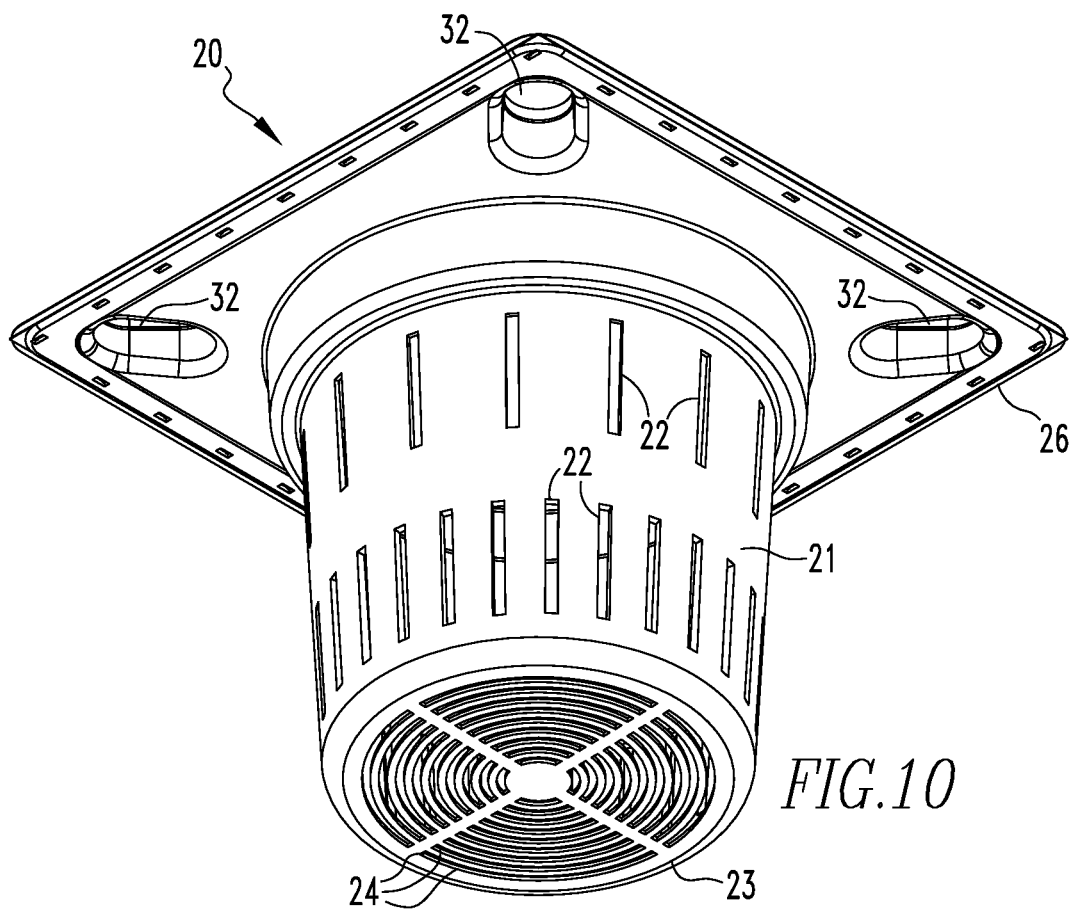
FIG. 10 is a bottom isometric view and FIG. 11 is a top view, respectively, a strainer basket for use a stormwater drain insert assembly in accordance with an embodiment of the present invention.
Figure 11:
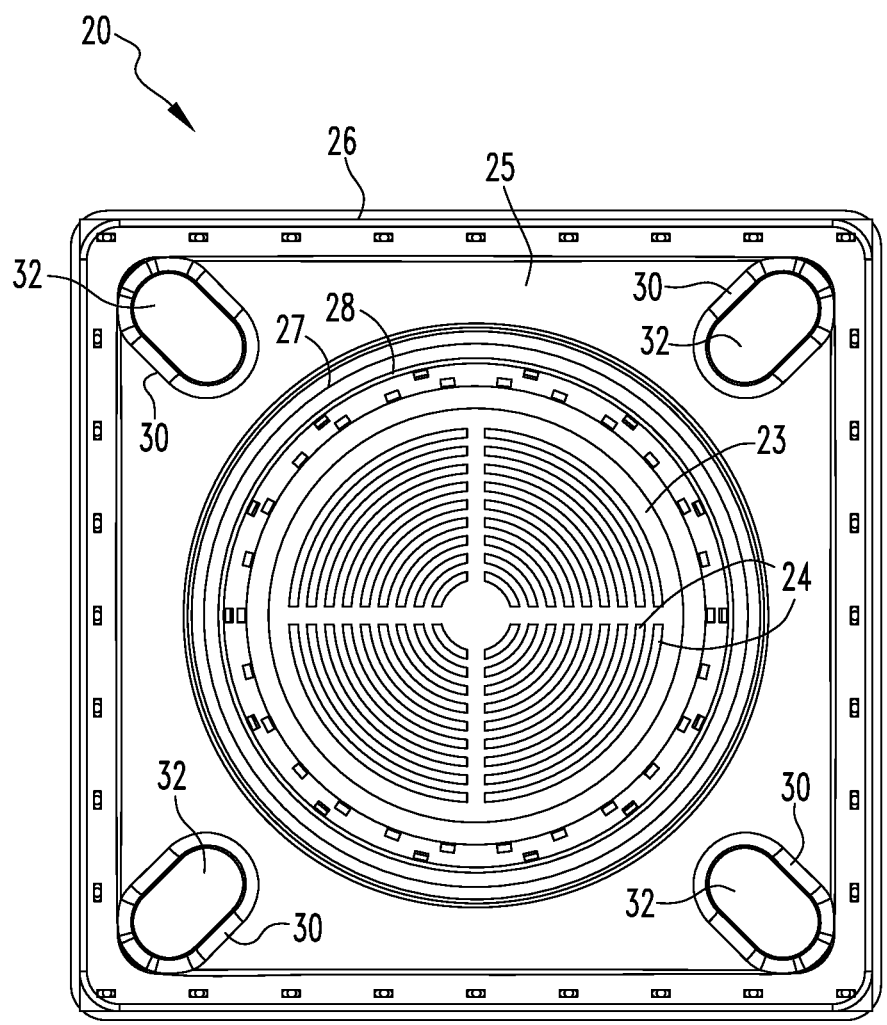
Figure 12:
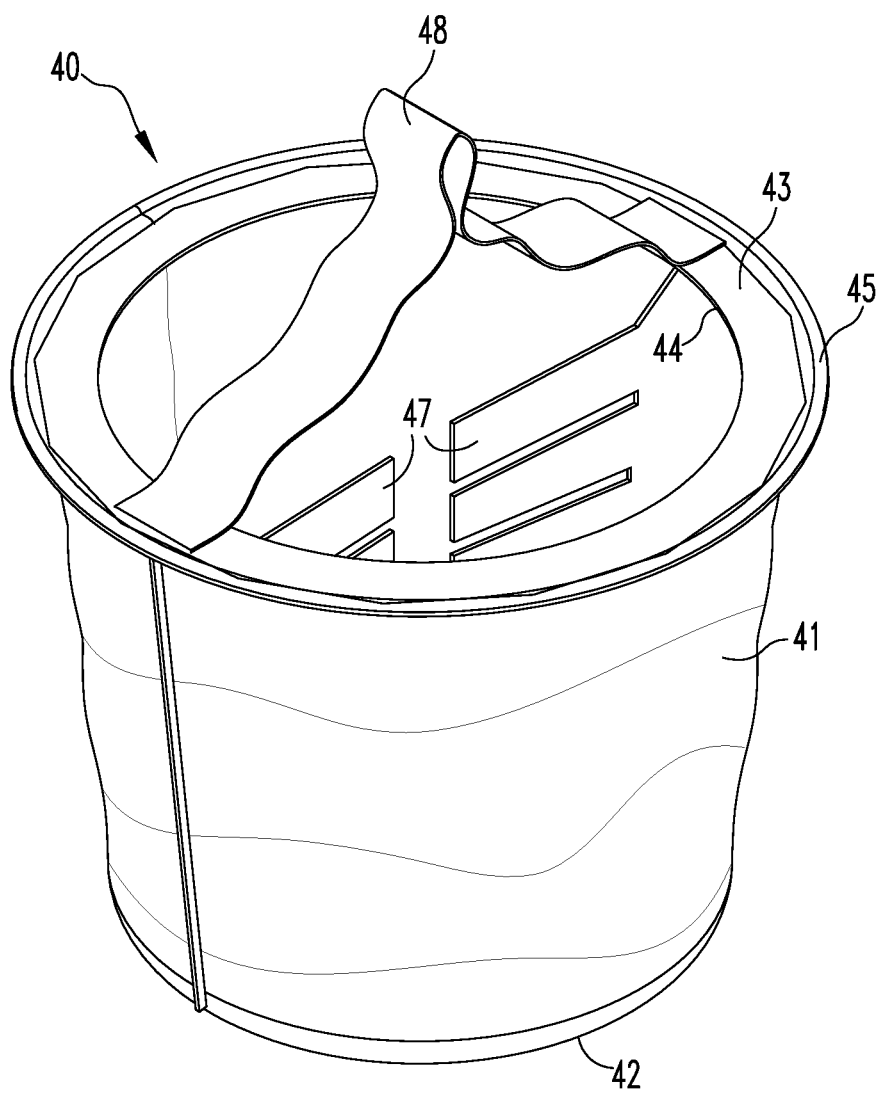
FIG. 12 is a partially schematic isometric view of a filter bag for use in a stormwater drain insert assembly in accordance with an embodiment of the present invention.

As shown in FIGS. 1 and 6, the optional circular flexible baffle 50 is sized such that it sits on the top panel 25 of the strainer basket inside the raised overflow ports 30. When the filter bag 40 is placed inside the strainer basket 20, it extends radially inwardly past the upper rim 43 of the filter bag 40 to direct flow into the filter bag 40. The circular flexible baffle 50 may be made from a single piece of material, or from two or more multiple pieces. The circular baffle 50 can be formed from a sheet of synthetic rubber, polyolefin, polyester or other flexible synthetic material, or it can be of made of a woven or nonwoven fabric. For example, the baffle material may comprise an SBR synthetic rubber. The circular baffle 50 may extend radially inward past the upper rim 43 of the filter bag 40 wall by a distance of 0.5 inch to 6 inches, for example, from 1 to 3 inches.

Figure 14:
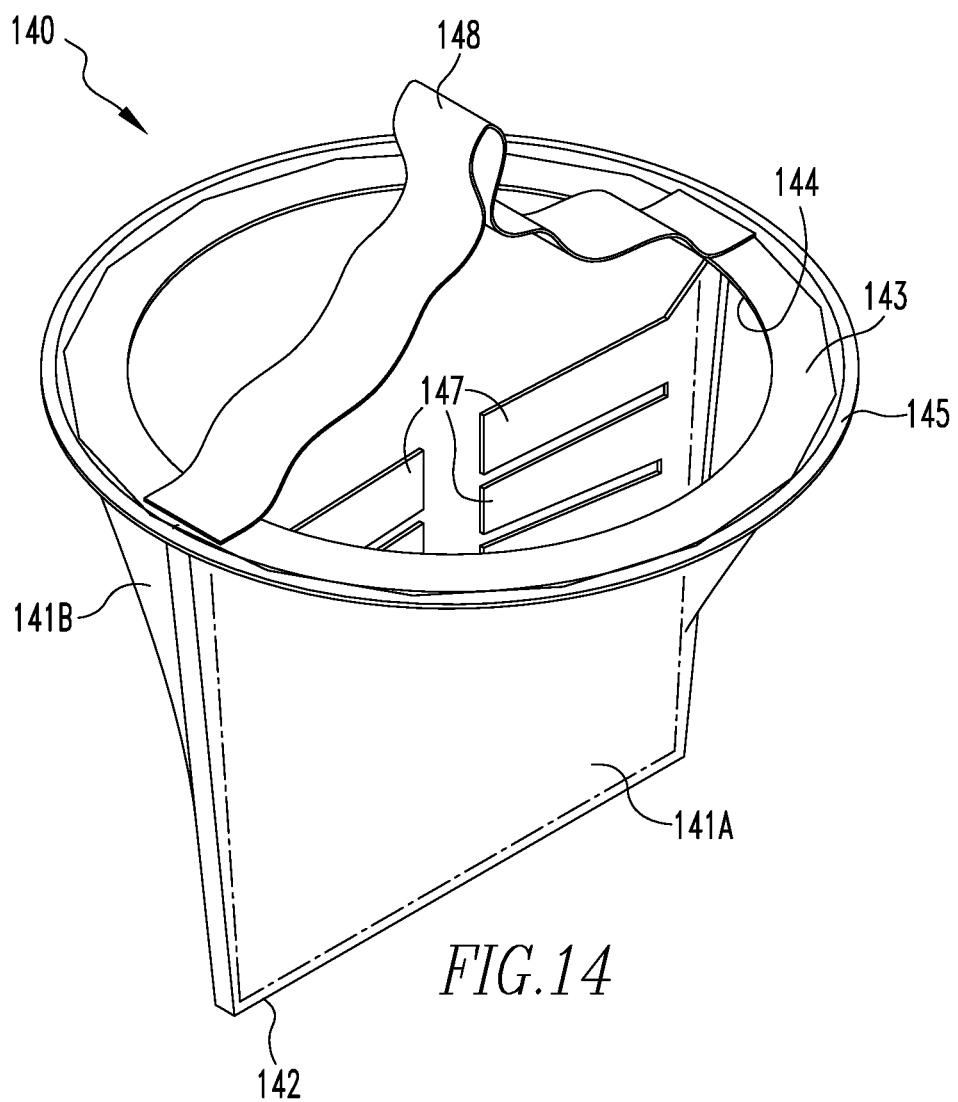
FIG. 14 is a partially schematic isometric view of a filter bag in accordance with an embodiment of the present invention.
Figure 15:
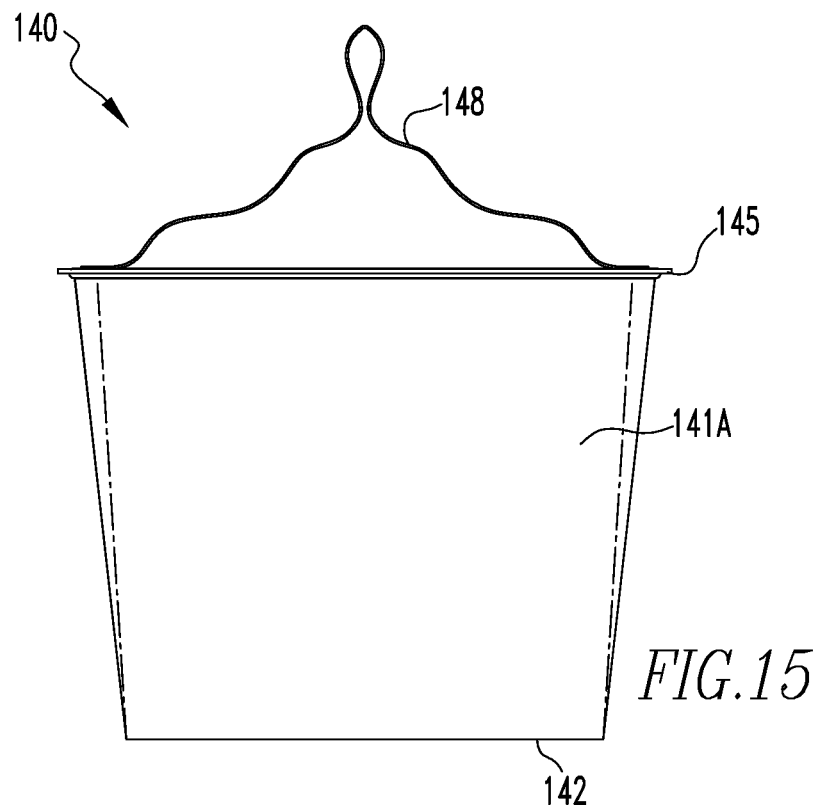
FIG. 15 is a front view and FIG. 16 is a side view of the filter bag shown in FIG. 14.
Figure 16:
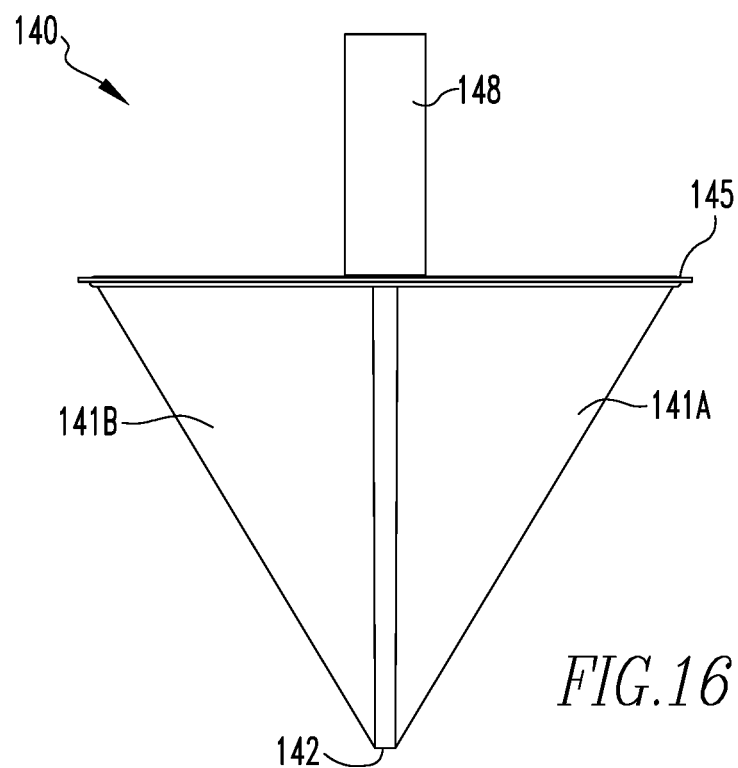

FIGS. 14-16 illustrate another filter bag 140 in accordance with an embodiment of the present invention. The filter bag 140 includes side panels 141A and 141B connected together at the bottom by a bottom edge seam 142. The filter bag 140 has an upper rim 143 with an upper central opening 144. A retention ring 145 may be provided at or near the outer periphery of the upper rim 143, such as within a pocket or fold of the fabric of the filter bag 140, in order to support the filter bag 140 in the strainer basket 20, as well as providing outward radial force against the central mouth opening 27 of the strainer basket 20 in order to produce unwanted by-pass leakage around the exterior of the upper rim 143. The filter bag 140 includes interior absorbent fingers 147 and a lifting handle or strap 148.

The heights of the filter bags 40 and 140 may typically be from 4 to 36 inches, or from 6 to 13 inches, for example, 10 or 11 inches. The filter bags 40 and 140 may comprise water permeable fabric that allows water to pass therethrough but traps sediment and other contaminants such as oils, hydrocarbons, heavy metals and the like. The fabric of the filter bags 40 and 140, and the interior absorbent fingers 47 and 147, may be oleophilic in order to help trap oils and other hydrocarbons. For example, the oleophilic water permeable fabric may be composed of polypropylene (PP) or polyethylene terephthalate (PET), e.g., having a basis weight of 8±1 ounces per square yard and a thickness of 0.1±0.033 inches. Such fabrics may be flexible and foldable to allow the filter bags 40 and 140 to be folded substantially flat prior to use, e.g., during shipping and storage.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A stormwater drain insert assembly comprising:
a top bib including a flexible sheet of material with a peripheral frame and a central bib opening;
a strainer basket supported by the top bib below the central bib opening comprising a sidewall having side openings, a top panel having a central mouth opening, a support shoulder adjacent to the central mouth opening above the sidewall, and at least one raised overflow port extending upward from an upper surface of the top panel structured and arranged to allow wastewater to flow therethrough if a height of the wastewater exceeds a height of the raised overflow port; and
a filter bag removably installed in the strainer basket, the filter bag comprising a water permeable sidewall extending downward from an upper rim, wherein the upper rim is supported by the support shoulder of the strainer basket inside the central mouth opening of the strainer basket.

2. The stormwater drain insert assembly of claim 1, wherein the flexible sheet of material of the top bib comprises a water-impermeable fabric.

3. The stormwater drain insert assembly of claim 2, further comprising a stiffening frame attached to the water-impermeable fabric adjacent to the central bib opening.

4. The stormwater drain insert assembly of claim 3, wherein the stiffening frame is attached to the top panel of the strainer basket.

5. The stormwater drain insert assembly of claim 1, comprising four of the raised overflow ports, wherein the top panel of the strainer basket is substantially square, and each of the four raised overflow ports are located adjacent to a different corner of the substantially square top panel.

6. The stormwater drain insert assembly of claim 1, wherein the at least one raised overflow port has a height measured from an upper surface of the top panel of from 1 to 2 inches.

7. The stormwater drain insert assembly of claim 1, comprising at least two of the raised overflow ports, wherein a total cross-sectional area of overflow openings of the raised overflow ports is from 5 to 20 percent of a cross-sectional area of the central mouth opening.

8. The stormwater drain insert assembly of claim 1, wherein the side openings comprise from 30 to 70 percent of an outer surface of the sidewall.

9. The stormwater drain insert assembly of claim 1, wherein the strainer basket further comprises a bottom wall having bottom openings comprising from 30 to 70 percent of an outer surface of the bottom wall.

10. The stormwater drain insert assembly of claim 1, wherein the upper rim of the filter bag comprises a retention ring supported by the support shoulder of the strainer basket.

11. The stormwater drain insert assembly of claim 10 wherein the retention ring is located in a pocket of the upper rim.

12. The stormwater drain insert assembly of claim 1, wherein the filter bag comprises at least one layer of water-permeable oleophilic fabric.

13. The stormwater drain insert assembly of claim 12, wherein the water-permeable oleophilic fabric comprises polypropylene or polyethylene terephthalate.

14. The stormwater drain insert assembly of claim 1, wherein the filter bag comprises two layers of water-permeable fabric defining a pocket therebetween, and the pocket is at least partially filled with an absorbent media.

15. The stormwater drain insert assembly of claim 14, wherein the absorbent media comprises zeolite, activated carbon, perlite, vermiculite or a combination thereof.

16. The stormwater drain insert assembly of claim 1, wherein the filter bag comprises a strap handle attached to the upper rim.

17. The stormwater drain insert assembly of claim 1, wherein the filter bag comprises fingers of oleophilic fabric extending inward from a sidewall of the filter bag into an interior volume of the filter bag.

18. The stormwater drain insert assembly of claim 1, further comprising a circular flexible baffle supported on the top panel of the strainer basket having an inner diameter less than an inner diameter of the upper rim of the filter bag.

19. A stormwater drain insert comprising:
a top bib including a flexible sheet of material with a peripheral frame and a central bib opening; and
a strainer basket structured and arranged to receive a filter bag, the strainer basket supported by the top bib below the central bib opening comprising a sidewall having side openings, a top panel having a central mouth opening, a support shoulder adjacent to the central mouth opening above the sidewall, and at least one raised overflow port extending upward from an upper surface of the top panel structured and arranged to allow wastewater to flow therethrough if a height of the wastewater exceeds a height of the raised overflow port.

20. The stormwater drain insert of claim 19, further comprising a filter bag structured and arranged for removeable installation in said strainer basket, the filter bag comprising two layers of water-permeable oleophilic fabric defining a pocket therebetween, and an absorbent media at least partially filling the pocket.

\* \* \* \* \*